(12) United States Patent
Patterson

(10) Patent No.: US 6,860,511 B2
(45) Date of Patent: Mar. 1, 2005

(54) MULTIPLE CHAMBER DUAL STAGE INFLATOR

(75) Inventor: Donald B. Patterson, New Hudson, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/401,091

(22) Filed: Mar. 26, 2003

(65) Prior Publication Data

US 2003/0222445 A1 Dec. 4, 2003

Related U.S. Application Data

(60) Provisional application No. 60/367,690, filed on Mar. 26, 2002.

(51) Int. Cl.$^7$ ............................................... B60R 21/28
(52) U.S. Cl. ....................................................... 280/741
(58) Field of Search ................................ 280/736, 737, 280/740, 741, 742

(56) References Cited

U.S. PATENT DOCUMENTS

| | | | | |
|---|---|---|---|---|
| 5,622,380 A | * | 4/1997 | Khandhadia et al. | ....... 280/736 |
| 6,019,389 A | * | 2/2000 | Burgi et al. | ................. 280/736 |
| 6,032,979 A | * | 3/2000 | Mossi et al. | ................. 280/741 |
| 6,149,193 A | * | 11/2000 | Canterberry et al. | ........ 280/741 |
| 6,168,200 B1 | * | 1/2001 | Greist et al. | ................. 280/736 |
| 6,189,922 B1 | | 2/2001 | Parks et al. | ................. 280/735 |
| 6,189,927 B1 | * | 2/2001 | Mossi et al. | ................. 280/741 |
| 6,648,370 B2 | * | 11/2003 | Koga et al. | ................. 280/736 |
| 6,659,500 B2 | * | 12/2003 | Whang et al. | .............. 280/741 |

* cited by examiner

Primary Examiner—Faye M. Fleming
(74) Attorney, Agent, or Firm—L. C. Begin & Associates, PLLC

(57) ABSTRACT

A dual stage inflator 10 utilizes a housing 12 having two supplemental propellant combustion chambers 16 and 26, both symmetrically oriented within a primary propellant combustion chamber 34. Chambers 16 and 26 are formed to be substantially equivalent in dimensions and volume thereby simplifying the assembly and manufacturing process.

4 Claims, 1 Drawing Sheet

MULTIPLE CHAMBER DUAL STAGE INFLATOR

CROSS REFERENCE TO RELATED APPLICATIONS

Figure 1:
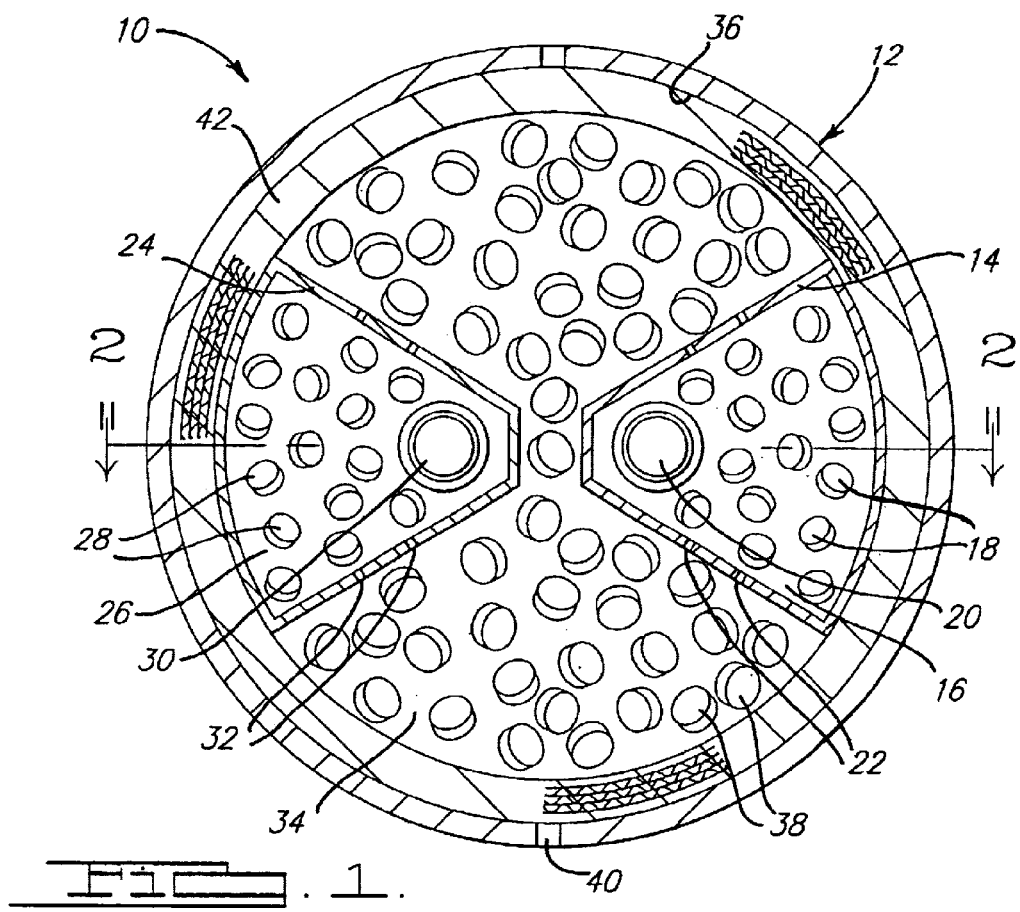
Figure 2:
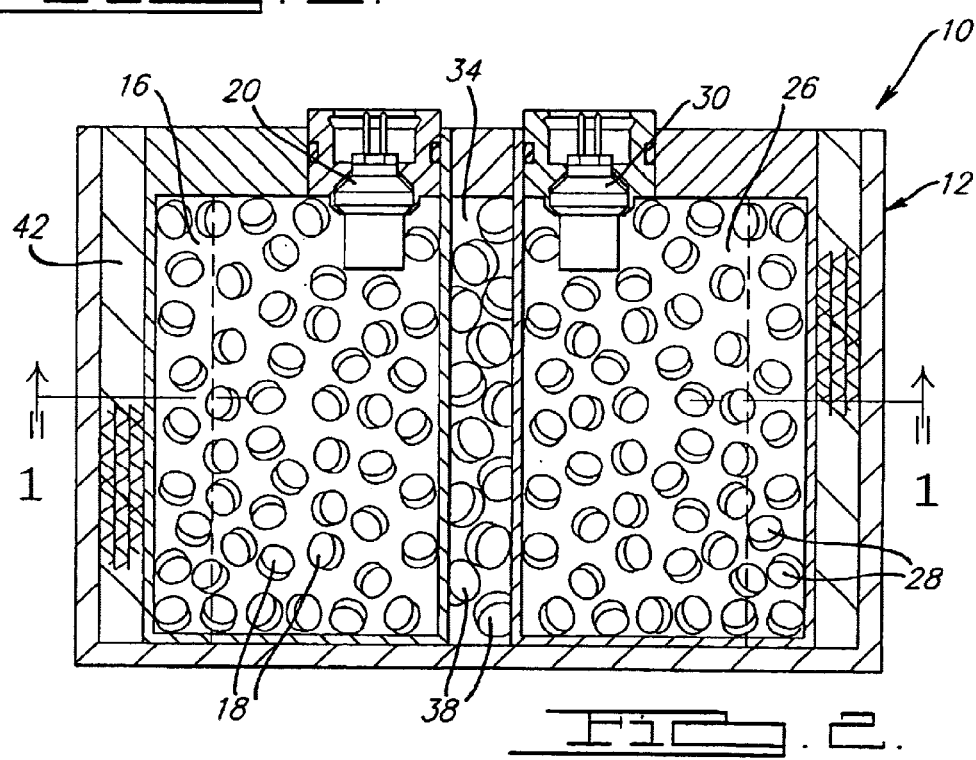

This application claims the benefit of provisional application Ser. No. 60/367,690 filed on Mar. 26, 2002.

FIELD OF THE INVENTION

The present invention relates to gas generators, used to inflate air bags in a vehicle occupant protection system for example, and more particularly, to an improved dual chamber gas generator containing an improved structure for isolating the propellant chambers of a dual chamber inflator so as to ensure proper deployment of the airbag while yet simplifying the manufacture thereof

BACKGROUND OF THE INVENTION

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag may cause the air bag to impact against the occupant with a greater force than necessary. In essence, the airbag volume and inflating capacity are designed to protect both large and small occupants and are generally not variable within the single gas generator. Occasionally, when an air bag utilizing a single gas generator is deployed, smaller occupants, usually children and smaller adults are protected, but sometimes with more force than is necessary. Accordingly, there is a continuous drive to reduce the force acting upon a respective occupant to a tailored force rather than utilizing a generalized force that protects all sizes of occupants.

Commonly owned U.S. Pat. No. 5,400,487 discloses an inflation system that overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, this design appears to accommodate passenger-side inflators only.

Other known designs employ multiple chamber inflators wherein the chambers are sized to different dimensions and volumes. As such, each chamber retains a relatively greater or lesser amount of gas generant depending on its size. Based on data gathered by an associated system algorithm, the size and/or position of the occupant is then determinative of what chamber or chambers are employed thereby resulting in a greater or lesser airbag restraining force. One concern is that this approach necessarily complicates the manufacturing process in that the inflator contains additional parts. Also, the system algorithm employed to process the occupant size and/or position data is necessarily more complex in that more choices or outcomes are required to accommodate the various permutations or combinations of firing the various chambers.

Therefore, a need exists for a multiple chamber gas generator that exhibits a simplified design, simplified manufacturing, and therefore lower material and manufacturing costs, and yet can still produce selective air bag inflation pressurization.

SUMMARY OF THE INVENTION

In accordance with the present invention, the above-referenced concerns are resolved by an inflator that exhibits reduced manufacturing costs and complexity. A multiple chamber inflator is provided comprising a perforate housing. A first wall within the housing forms a first perforate combustion chamber. A first gas generating composition or propellant is contained within the first chamber that when ignited produces a first inflating gas. A first igniter fixed within the first chamber selectively ignites the first propellant upon receipt of a signal from a crash sensor or system algorithm for example.

A second perforate combustion chamber is formed by a second wall within the housing and contains a second gas generant composition within the second chamber that when ignited produces a second inflating gas. A second igniter fixed within the second chamber selectively ignites the second propellant upon receipt of a signal from a crash sensor or system algorithm, for example. The perforated first and second walls are initially sealed prior to inflator operation. Upon selective operation of either chamber, independent operation of the other chamber is assured by the insulating seals provided about each of the first and second chambers. As such, either the first or second chamber may be operated without the resultant operation of the other chamber, if desired.

A primary combustion chamber is formed within the perforated housing and about the first and second chambers. The primary chamber is initially sealed to facilitate a pressure increase within the chamber until the pressure ruptures the associated seal. The primary chamber contains a primary gas generant composition that when combusted produces a primary inflating gas. Activation of either the first and/or second chamber results in fluid communication with the first and/or second inflating gas(es) and the primary propellant within the primary chamber. Accordingly, the primary propellant is therefore ignited by fluid communication with either or both of the first and second inflating gases and any attendant flame front created by combustion of the first and/or second gas generant compositions.

In accordance with the present invention, the first and second chambers are of equivalent dimension and volume. The first and second gas generant compositions are preferably of equal composition and in equal amounts, or, may be of different compositions and/or of different amounts. When the first and second chambers contain the same gas generant composition and in identical amounts, the need for part differentiation during the assembly process is eliminated. This reduces assembly error when connecting the system circuitry to the first and second igniters for the circuits communicating with either the first or second igniters fire equivalent systems. The first and second chambers are preferably disposed symmetrically within the primary chamber. Use of equal-sized first and second chambers requires less tooling, thereby reducing manufacturing costs and simultaneously reducing manufacturing and assembly complexity.

DETAILED DESCRIPTION OF THE PREFERRED EMBODIMENT(S)

A multiple chamber inflator 10 contains a perforate housing 12. The housing is initially sealed to facilitate a pressure buildup upon inflator 10 operation. A first wall 14 is fixed or disposed within the housing 12 and forms a first chamber 16. A first gas generant composition or propellant 18 is housed within the chamber 16 and provides a first inflating gas upon selective combustion thereof. A first igniter 20 is fixed or disposed within the chamber 16 and in a known manner ignites the propellant 18 upon receipt from a crash sensor algorithm, for example. A first at least one gas exit orifice 22 and preferably a plurality of gas exit orifices 22 provides fluid communication between the first inflating gas and any attendant flame front with the interior of the housing 12. The orifice(s) 22 is sealed prior to activation of the first chamber 16 thereby insulating the chamber from exterior combustion.

In accordance with the present invention, a second wall 24 is fixed or disposed within the housing 12 and forms a second chamber 26 of a specified dimension and volume substantially equivalent or equal to the dimension and volume of the first chamber 16. A second gas generant composition or propellant 28 is housed within the chamber 26 and provides a second inflating gas upon selective combustion thereof. A second igniter 30 is fixed or disposed within the chamber 26 and in a known manner ignites the propellant 28 upon receipt from a system algorithm, for example. A second at least one gas exit orifice 32 and preferably a plurality of gas exit orifices 32 provides fluid communication between the second inflating gas and any attendant flame front with the interior of the housing 12. The orifice(s) 32 is sealed prior to activation of the second chamber 26 thereby insulating the chamber from exterior combustion. Accordingly, independent operation of either the insulated first chamber 16 or the second insulated chamber 26 is assured, without the risk of inadvertent ignition of the composition contained in any unactivated chamber.

A primary combustion chamber 34 is defined by an inner housing wall 36 and therefore also formed within the housing 12 and about chambers 16 and 26. A main propellant 38 is contained within the primary chamber 34 that when combusted produces an effective amount of a third or primary inflating gas. Activation of the first chamber 16 and/or the second chamber 26 produces a first and/or second respective inflating gas that upon exiting its respective chamber commingles with the primary propellant 38 within chamber 34 and thereby ignites the propellant 38. Accordingly, it is an object of the present invention to first produce an inflating gas(es) within an inner chamber 16 or 26, or both, and then produce a primary inflating gas within chamber 34, thereby promoting a gradual rather than abrupt onset of the inflating pressure resulting from ignition of the propellant 38 and commingling of the inflating gases within chamber 34. A third at least one gas exit orifice 40 and preferably a plurality of gas exit orifices 40 are oriented about the periphery of the housing 12 and initially sealed prior to inflator 10 operation. Upon inflator 10 operation, the pressure buildup with chamber 34 results in rupture of the seals of orifice(s) 40 thereby facilitating the release of gas into an airbag (not shown).

In accordance with the present invention, chambers 16 and 26 are of equal dimension or size. Gas generating compositions 18 and 28 may be of equal composition and in equal amounts, or, may be of different compositions and/or of different amounts. Gas generating composition 38 may be the same or different composition as employed in chambers 16 and/or 26. In a preferred embodiment, chambers 16 and 26 contain the same gas generant composition and in identical amounts thereby eliminating the need for part differentiation during the assembly process. As shown in the figures, chambers 16 and 26 are preferably disposed symmetrically within chamber 34, or, stated another way, are disposed opposite one another in chamber 34. Symmetric orientation provides greater stability when both first and second chambers are simultaneously activated. If desired, the inflator 10 further contains a filter 42 radially disposed about the chamber 34 for filtration of the combustion gases.

The inflator 10 of the present invention is formed by methods known in the art. The housing 12, for example, may be formed from a cap and a base by stamping or other known forming processes. For example, chambers 16 and 26 may be cast or stamped and then welded, or otherwise fixed to the housing 12.

The igniters 20 and 30 and the gas generant compositions 18, 28, and 38 are state-of-the art igniters and compositions, respectively, well known for their use in airbag inflators, for example. The filter 42 may be provided as expanded wire from Wayne Wire in Saginaw, Mich.

Exemplary description of known igniters, gas generant compositions, and/or formation processes are described, but not by limitation, in U.S. Pat. Nos. 5,035,757, 5,622,380, 5,628,528, 5,806,888, 6,023,664 and 5,872,329, each incorporated herein by reference.

In accordance with the present invention, inflators having equal-sized inner chambers 16 and 26 require less tooling and therefore reduce manufacturing costs and complexity. Additionally, identical construction of chambers 16 and 26, i.e. having the same type and amount of gas generant composition and having the same igniter, eliminates the need for maintaining part orientation throughout the manufacturing process. For example, during assembly either igniter connector lead may be connected to either igniter without adverse performance.

It will be understood that the foregoing description of the preferred embodiment of the present invention is for illustrative purposes only. As such, the various structural and operational features herein disclosed are susceptible to a number of modifications, none of which departs from the scope of the present invention as defined in the appended claims.

What is claimed is:

1. A gas generator comprising:
    a perforated housing defining an inner wall;
    a first perforated wall contained within said housing and forming a first combustion chamber, said first chamber having a first dimension and volume;
    a first gas generant composition within said first chamber, said first gas generant ignitable to provide a gas upon combustion thereof;

a first igniter fixed within said first chamber for ignition of said first gas generant composition;

a second perforated wall contained within said housing and forming a second combustion chamber, said second chamber having a second dimension and volume substantially equivalent to said first dimension and volume;

a second gas generant composition within said second chamber, said second gas generant ignitable to provide a gas upon combustion thereof;

a second igniter fixed within said second chamber for ignition of said second gas generant composition;

a primary chamber defined by said housing inner wall, wherein contents of said primary chamber fluidly communicate with the combustion products of said first and/or second chambers upon activation of said gas generator; and a primary gas generant composition contained within said primary chamber for producing a primary inflating gas upon contact by the gas of said first and/or second chambers, wherein upon gas generator operation the first and/or second gas generant compositions are ignited to produce combustion products that upon exiting said first and/or second chambers, respectively, thereby ignites said primary gas generant composition.

2. The gas generator of claim 1 wherein said first and second gas generant compositions are substantially equivalent in composition and quantity.

3. The gas generator of claim 1 wherein said first and second chambers are symmetrically oriented within said primary chamber.

4. A gas generator comprising:

a perforated housing defining an inner wall;

a first perforated wall contained within said housing and forming a first combustion chamber, said first chamber having a first dimension and volume;

a first gas generant composition within said first chamber, said first gas generant ignitable to provide a gas upon combustion thereof;

a second perforated wall contained within said housing and forming a second combustion chamber, said second chamber having a second dimension and volume substantially equivalent to said first dimension and volume;

a second gas generant composition within said second chamber, said second gas generant ignitable to provide a gas upon combustion thereof; and a primary chamber defined by said housing inner wall, wherein contents of said primary chamber fluidly communicate with the combustion products of said first and/or second chambers upon activation of said gas generator.

* * * * *

UNITED STATES PATENT AND TRADEMARK OFFICE
CERTIFICATE OF CORRECTION

PATENT NO. : 6,860,511 B2
DATED : March 1, 2005
INVENTOR(S) : Patterson, Donald B.

It is certified that error appears in the above-identified patent and that said Letters Patent is hereby corrected as shown below:

Column 2,
Line 42, delete "scaled" and insert -- sealed --.

Signed and Sealed this

Thirty-first Day of May, 2005

JON W. DUDAS
*Director of the United States Patent and Trademark Office*